United States Patent
Meyer et al.

(10) Patent No.: US 8,155,420 B2
(45) Date of Patent: Apr. 10, 2012

(54) SYSTEM AND METHOD FOR DETECTING POOR QUALITY IN 3D RECONSTRUCTIONS

(75) Inventors: Michael G. Meyer, Seattle, WA (US); Rahul Katdare, Seattle, WA (US); David Ethan Steinhauer, Lynnwood, WA (US); J. Richard Rahn, Sammamish, WA (US)

(73) Assignee: Visiongate, Inc, Phoenix, AZ (US)

( * ) Notice: Subject to any disclaimer, the term of this patent is extended or adjusted under 35 U.S.C. 154(b) by 393 days.

(21) Appl. No.: 12/470,413

(22) Filed: May 21, 2009

(65) Prior Publication Data
US 2010/0296713 A1    Nov. 25, 2010

(51) Int. Cl.
G06K 9/00 (2006.01)
G06T 17/00 (2006.01)

(52) U.S. Cl. ........ 382/131; 382/224; 382/128; 382/130; 345/424

(58) Field of Classification Search ............... 382/130, 382/131, 128, 274, 276, 224; 600/431, 428, 600/425; 378/4, 8, 21, 62, 901; 345/424
See application file for complete search history.

(56) References Cited

U.S. PATENT DOCUMENTS

| | | |
|---|---|---|
| 3,657,537 A | 4/1972 | Wheeless, Jr. |
| 3,705,771 A | 12/1972 | Friedman et al. |
| 3,748,468 A | 7/1973 | Hartman |
| 3,999,047 A | 12/1976 | Green |
| 4,175,860 A | 11/1979 | Bacus |
| 4,360,885 A | 11/1982 | Edgar |
| 4,786,165 A | 11/1988 | Yamamoto |
| 4,858,128 A | 8/1989 | Nowak et al. |
| 4,873,653 A | 10/1989 | Grosskopf |
| 5,141,609 A | 8/1992 | Sweedler |
| 5,148,502 A | 9/1992 | Tsujiuchi |
| 5,159,398 A | 10/1992 | Maekawa et al. |
| 5,189,518 A | 2/1993 | Nishida et al. |
| 5,402,460 A | 3/1995 | Johnson |
| 5,539,800 A | 7/1996 | Katsevich |
| 5,550,892 A | 8/1996 | Katsevich |
| 5,552,605 A | 9/1996 | Arata |

(Continued)

FOREIGN PATENT DOCUMENTS
EP    1704874 A2    9/2006

OTHER PUBLICATIONS
Schmitz, et al., "Performance Characteristics of a Silicon Photodiode (SiPD) Based Instrument for Fast Functional Optical Tomography," SUNY Downstate Medical Center, 2001, Brooklyn, NY 11203.

(Continued)

*Primary Examiner* — Sang Nguyen
(74) *Attorney, Agent, or Firm* — George A. Leone; Citadel Patent Law (57) ABSTRACT

A system and method for detecting poor quality images in an optical tomography system includes an acquisition apparatus for acquiring a set of pseudo-projection images of an object having a center of mass, where each of the set of pseudo-projection images is acquired at a different angle of view. A reconstruction apparatus is coupled to receive the pseudo-projection images, for reconstruction of the pseudo-projection images into 3D reconstruction images. A quality apparatus is coupled to receive the 3D reconstruction images and operates to detect of selected features that characterize poor quality reconstructions.

20 Claims, 9 Drawing Sheets

U.S. PATENT DOCUMENTS

| | | | |
|---|---|---|---|
| 5,644,388 | A | 7/1997 | Maekawa et al. |
| 5,680,484 | A | 10/1997 | Ohyama |
| 5,760,901 | A | 6/1998 | Hill |
| 5,835,617 | A | 11/1998 | Ohta et al. |
| 5,878,103 | A | 3/1999 | Sauer |
| 5,909,476 | A | 6/1999 | Cheng et al. |
| 5,915,048 | A | 6/1999 | Hill et al. |
| 5,987,158 | A | 11/1999 | Meyer |
| 6,026,174 | A | 2/2000 | Palcic |
| 6,078,681 | A | 6/2000 | Silver |
| 6,091,983 | A | 7/2000 | Alfano et al. |
| 6,130,958 | A | 10/2000 | Rohler et al. |
| 6,165,734 | A | 12/2000 | Garini |
| 6,201,628 | B1 | 3/2001 | Basiji |
| 6,211,955 | B1 | 4/2001 | Basiji |
| 6,215,587 | B1 | 4/2001 | Alfano et al. |
| 6,249,341 | B1 | 6/2001 | Basiji et al. |
| 6,252,979 | B1 | 6/2001 | Lee |
| 6,388,809 | B1 | 5/2002 | MacAulay |
| 6,442,235 | B2 * | 8/2002 | Koppe et al. ............. 378/62 |
| 6,473,176 | B2 | 10/2002 | Basiji |
| 6,512,807 | B1 * | 1/2003 | Pohlman et al. ............. 378/4 |
| 6,519,355 | B2 | 2/2003 | Nelson |
| 6,522,775 | B2 | 2/2003 | Nelson et al. |
| 6,542,573 | B2 * | 4/2003 | Schomberg ............. 378/19 |
| 6,591,003 | B2 | 7/2003 | Chu et al. |
| 6,608,682 | B2 | 8/2003 | Ortyn et al. |
| 6,636,623 | B2 | 10/2003 | Nelson et al. |
| 6,697,508 | B2 | 2/2004 | Nelson |
| 6,741,730 | B2 | 5/2004 | Rahn et al. |
| 6,770,893 | B2 | 8/2004 | Nelson |
| 6,823,204 | B2 * | 11/2004 | Grass et al. ............. 600/407 |
| 6,850,587 | B1 | 2/2005 | Karimi |
| 6,944,322 | B2 | 9/2005 | Johnson et al. |
| 6,975,400 | B2 | 12/2005 | Ortyn et al. |
| 7,003,143 | B1 | 2/2006 | Hewitt |
| 7,141,773 | B2 | 11/2006 | Kaplan et al. |
| 7,197,355 | B2 | 3/2007 | Nelson |
| 7,218,393 | B2 | 5/2007 | Sharpe et al. |
| 7,224,540 | B2 | 5/2007 | Olmstead et al. |
| 7,260,253 | B2 | 8/2007 | Rahn et al. |
| 7,274,809 | B2 | 9/2007 | MacAulay et al. |
| 7,440,535 | B2 * | 10/2008 | Netsch et al. ............. 378/4 |
| 7,505,549 | B2 * | 3/2009 | Ohishi et al. ............. 378/4 |
| 7,505,551 | B2 * | 3/2009 | Grass et al. ............. 378/8 |
| 7,539,529 | B2 * | 5/2009 | Schmitt et al. ............. 600/431 |
| 7,738,945 | B2 * | 6/2010 | Fauver et al. ............. 600/425 |
| 7,811,825 | B2 * | 10/2010 | Fauver et al. ............. 436/63 |
| 7,835,561 | B2 * | 11/2010 | Meyer et al. ............. 382/131 |
| 2002/0122167 | A1 | 9/2002 | Riley et al. |
| 2003/0199758 | A1 | 10/2003 | Nelson |
| 2004/0076319 | A1 | 4/2004 | Fauver et al. |
| 2004/0228520 | A1 | 11/2004 | Dresser |
| 2005/0085721 | A1 | 4/2005 | Fauver et al. |
| 2006/0023219 | A1 | 2/2006 | Meyer et al. |
| 2006/0066837 | A1 | 3/2006 | Ortyn et al. |
| 2006/0068371 | A1 | 3/2006 | Ortyn et al. |
| 2006/0093200 | A1 | 5/2006 | Sharpe et al. |
| 2006/0204071 | A1 | 9/2006 | Ortyn et al. |
| 2007/0146873 | A1 | 6/2007 | Ortyn et al. |
| 2007/0215528 | A1 | 9/2007 | Hayenga et al. |
| 2007/0258122 | A1 | 11/2007 | Chamgoulov et al. |
| 2008/0175455 | A1 * | 7/2008 | John et al. ............. 382/130 |
| 2008/0285827 | A1 | 11/2008 | Meyer et al. |
| 2009/0103792 | A1 | 4/2009 | Rahn et al. |

OTHER PUBLICATIONS

Schmitz, et al., "Instrument for Real-Time Dynamic Optical Tomography," SUNY Downstate Medicial Center, 2002, Brooklyn, NY 11203.

King, M.C. and D. H. Berry, D.H., A Depth Scanning Microscope, Applied Optics, vol. 10, No. 1, Jan. 1971, pp. 208-210.

Bellman, S.H. et al., "Art is Science being a Defense of Algebraic Reconstruction Techniques for Three dimensional Electron Microscopy," Journal of Theoretical Biology, 1971, 32 pp. 205-216.

Gilbert, P., "Iterative Methods for the Three dimensional Reconstruction of an Object from Projections," Journal of Theoretical Biology, 1972, 36 pp. 105-117.

Oppenheim, B. E., "More Accurate Algorithms for Iterative 3 dimensional Reconstruction," IEEE Transactions on Nuclear Science, 1974, NS-21 pp. 72-77.

Shannon, The Art and Science of Optical Design, (1977) University of Arizona, Cambridge University Press, Fig. 4.12 and Fig. 4.13.

Klug, A, "Image analysis and reconstruction in the electron microscopy of biological macromolecules," Chem. Scripta, 1979, vol. 14, p. 245.

Herman, G, "Image Reconstruction from Projections: The Fundamentals of Computerized Tomography," Academic Press, 1980, New York.

Pieper, R.J. and Korpel A., Image processing for extended depth of field, Applied Optics, May 15, 1983, vol. 22, No. 10, pp. 1449-1453.

Reymond et al., "A Routine Flat Embedding Method for Electron Microscopy of Microorganisms Allowing Selection and Precisely Orientated Sectioning of Single Cells by Light Microscopy," Journal of Microscopy, Apr. 1983, vol. 130 Pt. 1 pp. 79-84.

Ong, S. H., "Development of an imaging flow cytometer." Anal Quant Cytol Histol, 1987, 9(5)pp. 375-382.

Kak, A.C. and Slaney, M., "Principles of Computerized Tomographic Imaging," IEEE Press, 1988, New York.

Singer, J. R. et al., "Image Reconstruction of the Interior of Bodies that Diffuse Radiation," Science 248(4958),1990, pp. 990-993.

Kikuchi, S., "Three-dimensional computed tomography for optical microscopes," Optics Communications, 1994, 107, pp. 432-444.

Tiziani, H. J. et al., "Three-dimensional analysis by a microlens array confocal arrangements" Applied Optics, (1994) 33, 567.

Paulsen, K. D., "Spatially Varying Optical Property Reconstruction Using a Finite Element Diffusion Equation Approximation," Medical Physics, 1995, vol. 22 pp. 691-701.

Shapiro, H. M., Practical Flow Cytometry, 3rd ed., 1995, Wiley-Liss.

Defrise, M., "Image Reconstruction from Truncated, Two-dimensional, Parallel Projections," Inverse Problems, 1995, 11 pp. 287-313.

Pawley, J. B., "Handbook of Biological Confocal Microscopy," 1995, Plenum Press, NY 479-490.

Wedberg, T.C., "Recent results in optical diffraction microtomography," Meas. Sci. Technol., 1996, vol. 7, p. 414.

Kikuchi, S. et al., "Three-dimensional microscope computed tomography based on general Radon transform for optical imaging systems," Optics Communications 123 (1996) 725-733.

Sheppard, C. J. R. & Torok, P., "Effects of specimen refractive index on confocal imaging," Journal of Microscopy, Mar. 1997, vol. 185, Pt. 3, pp. 366-374.

Taguchi, K. and Aradate, H., "Algorithm for Image Reconstruction in Multi-slice Helical CT", Medical Physics, 1998, 25(4) pp. 550-561.

Hampel, U and Freyer, R, "Fast Image Reconstruction for Optical Absorption Tomography in Media with Radially Symmetric Boundaries," Medical Physics, 1998, 25 (1)pp. 92-101.

Tucker, S.C. et al., "Extended depth of field and aberration control for inexpensive digital microscope systems," Optics Express, May 24, 1999, vol. 4, No. 11, pp. 467-474.

Edelmann, P. et al., "Correlation of chromatic shifts and focal depth in Spectral Precision Distance Microscopy measured by Micro Axial Tomography," Optical Biopsies and Microscopic Techniques III, Sep. 1999, SPIE vol. 3568, pp. 89-95.

Yu, D. F. et al., Maximum-Likelihood Transmission Image Reconstruction for Overlapping Transmission Beams, IEEE Transactions on Medical Imaging, 2000, 19(11)pp. 1094-1105.

Endo, M. et al., "Effect of Scattered Radiation on Image Noise in Cone Beam CT," Medical Physics, 2001, 28(4) (469-74).

Herzenberg, L. A., The History and Future of the Fluoresence Activated Cell Sorter and Flow Cytometry: A View from Stanford, 2002.

Sharpe, J. et al., "Optical Projection Tomography as a Tool for 3D Microscopy and Gene Expression Studies," Science, Apr. 19, 2002, vol. 296, pp. 541-545.

Widjanarko, T., et al., "A post-processing technique for extending depth of focus in conventional optical microscopy," Optics & Laser Technology, 2002, 34 pp. 299-305.

Matula, P. et al., "Precise 3D image alignment in micro-axial tomography," Journal of Microscopy, Feb. 2003, vol. 209, Pt. 2 pp. 126-142.

Sharpe, J. et al., Review, "Optical Projection Tomography as a New Tool for Studying Embryo Anatomy," J. Anat. 2003, pp. 175-181.

Lane, P.M. et al., "Confocal Microendoscopy with Chromatic Sectioning," Spectral Imaging: Instrumentation, Applications, and Analysis II, Proc. of SPIE, 2003, vol. 4959 pp. 23-26.

Fauver et al., "Development of Micro-Optical Projection Tomography for 3D Analysis of Single Cells, Image Acquisition and Processing XI," Edited by Conchello, Jose-Angel; Cogswell, Carol J.; Wilson, Tony. Proceedings of the SPIE, 2004, vol. 5324, pp. 171-181.

Fauver et al., "Three-dimensional imaging of single isolated cell nuclei using optical projection tomography," Optics Exress, May 30, 2005, vol. 13 No. 11/4210-4223.

Abrahamsson, S. et al., "A new approach to extended focus for high-speed, high-resolution biological microscopy," Proc. of SPIE, 2006, vol. 60900, N1-N8.

Mikula, G. et al., "Imaging with extended focal depth by means of lenses with radial and angular modulation," Optics Express, Jul. 23, 2007, vol. 15, No. 15, pp. 9184-9193.

Xu, Y. et al., "Ultra long high resolution beam by multi-zone rotationally symmetrical complex pupil filter," Optics Express, May 10, 2007, vol. 15, No. 10, pp. 6409-6413.

Conchello, J-A. et al., "Extended depth-of-focus microscopy via constrained deconvolution," Journal of Biomedical Optics 12 (6), 064026 (Nov./Dec. 2007).

Smolinska and Dawidowicz, "Extraction of common or different part from optical images," Institute of Physics, Warsaw Technical University, 222-223.

Meyer, et al., "Automated cell analysis in 2D and 3D: A comparative study," Science Direct: Pattern Recognition, 2009, 42 pp. 141-146.

* cited by examiner

SYSTEM AND METHOD FOR DETECTING POOR QUALITY IN 3D RECONSTRUCTIONS

FIELD OF THE INVENTION

The present invention relates generally to analysis of medical imaging data, and, more particularly, to detecting poor quality in three-dimensional (3D) reconstructions in a biological cell imager.

BACKGROUND OF THE INVENTION 3D tomographic reconstructions require projection images as input. A projection image assumes that an object of interest is translucent to a source of exposure such as a light source transmitted through the object of interest. The projection image, then, comprises an integration of the absorption by the object along a ray from the source to the plane of projection. Light in the visible spectrum is used as a source of exposure in optical projection tomography.

In the case of producing projections from biological cells, the cells are typically stained with hematoxylin, an absorptive stain that attaches to proteins found in cell chromosomes. Cell nuclei are approximately 15 microns in diameter, and in order to promote reconstructions of sub-cellular features it is necessary to maintain sub-micron resolution. For sub-micron resolution, the wavelength of the illuminating source is in the same spatial range as the biological objects of interest. This can result in undesirable refraction effects. As a result a standard projection image cannot be formed. To avoid these undesirable effects, as noted above, the camera aperture is kept open while the plane of focus is swept through the cell. This approach to imaging results in equal sampling of the entire cellular volume, resulting in a pseudo-projection image. A good example of an optical tomography system has been published as United States Patent Application Publication 2004-0076319, on Apr. 22, 2004, corresponding to U.S. Pat. No. 7,738,945 issued Jun. 15, 2010, to Fauver, et al. and entitled "Method and Apparatus for Pseudo-Projection Formation for Optical Tomography." U.S. Pat. No. 7,738,945 is incorporated herein by reference.

An optical tomography system may advantageously employ scores for classifying objects of interest, for example, to detect lung cancer in its pre-invasive and treatable stage. In order to do so with accuracy and reliability, the classification scores must be based on good quality 3D reconstruction images of the objects being classified. One example of an optical tomography system is being built by VisionGate, Inc. of Gig Harbor Wash., assignee of this application, is under the trademark "Cell-CT™." In one aspect, the Cell-CT™ optical tomography system employs scores, designed to provide an indication of lung cancer in its pre-invasive and treatable stage.

While it is generally understood that poor quality 3D reconstructions may adversely affect classification results in optical tomography systems, an automated system for detecting such poor quality 3D reconstructions has been lacking until now. The system and method disclosed herein provides, for the first time, a solution for detection of poor quality 3D reconstructions useful for an optical tomography system, for example.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system and method for detecting poor quality images in an optical tomography system is presented. The system includes an acquisition means for acquiring a set of projection images of an object having a center of mass, where each of the set of projection images is acquired at a different angle of view. A reconstruction means is coupled to receive the projection images, for reconstruction of the projection images into 3D reconstruction images. A quality means for classification of the 3D reconstruction images uses selected features that characterize poor quality reconstructions.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DESCRIPTION OF THE PREFERRED EMBODIMENT

The following disclosure describes several embodiments and systems for imaging an object of interest. Several features of methods and systems in accordance with example embodiments of the invention are set forth and described in the figures. It will be appreciated that methods and systems in accordance with other example embodiments of the invention can include additional procedures or features different than those shown in figures.

Example embodiments are described herein with respect to biological cells. However, it will be understood that these examples are for the purpose of illustrating the principles of the invention, and that the invention is not so limited. Additionally, methods and systems in accordance with several example embodiments of the invention may not include all of the features shown in these figures. Throughout the figures, like reference numbers refer to similar or identical components or procedures.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one example" or "an example embodiment," "one embodiment," "an embodiment" or various combinations of these terms means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Generally as used herein the following terms have the following meanings when used within the context of optical tomography processes:

"Capillary tube" has its generally accepted meaning and is intended to include transparent microcapillary tubes and equivalent items with an inside diameter generally of 500 microns or less.

"Depth of field" is the length along the optical axis within which the focal plane may be shifted before an unacceptable image blur for a specified feature is produced.

"Object" means an individual cell, item, thing, particle or other microscopic entity.

"Pseudo-projection" or "pseudo-projection image" includes a single image representing a sampled volume of extent larger than the native depth of field of a given set of optics. One concept of a pseudo-projection is taught in Fauver '744.

"Specimen" means a complete product obtained from a single test or procedure from an individual patient (e.g., sputum submitted for analysis, a biopsy, or a nasal swab). A specimen may be composed of one or more objects. The result of the specimen diagnosis becomes part of the case diagnosis.

"Sample" means a finished cellular preparation that is ready for analysis, including all or part of an aliquot or specimen.

As used in this specification, the terms "processor" and "computer processor" encompass a personal computer, a microcontroller, a microprocessor, a field programmable object array (FPOA), a digital signal processor (DSP), an application-specific integrated circuit (ASIC), a field programmable gate array (FPGA), a programmable logic array (PLA), or any other digital processing engine, device or equivalent including related memory devices, transmission devices, pointing devices, input/output devices, displays and equivalents.

Figure 1:
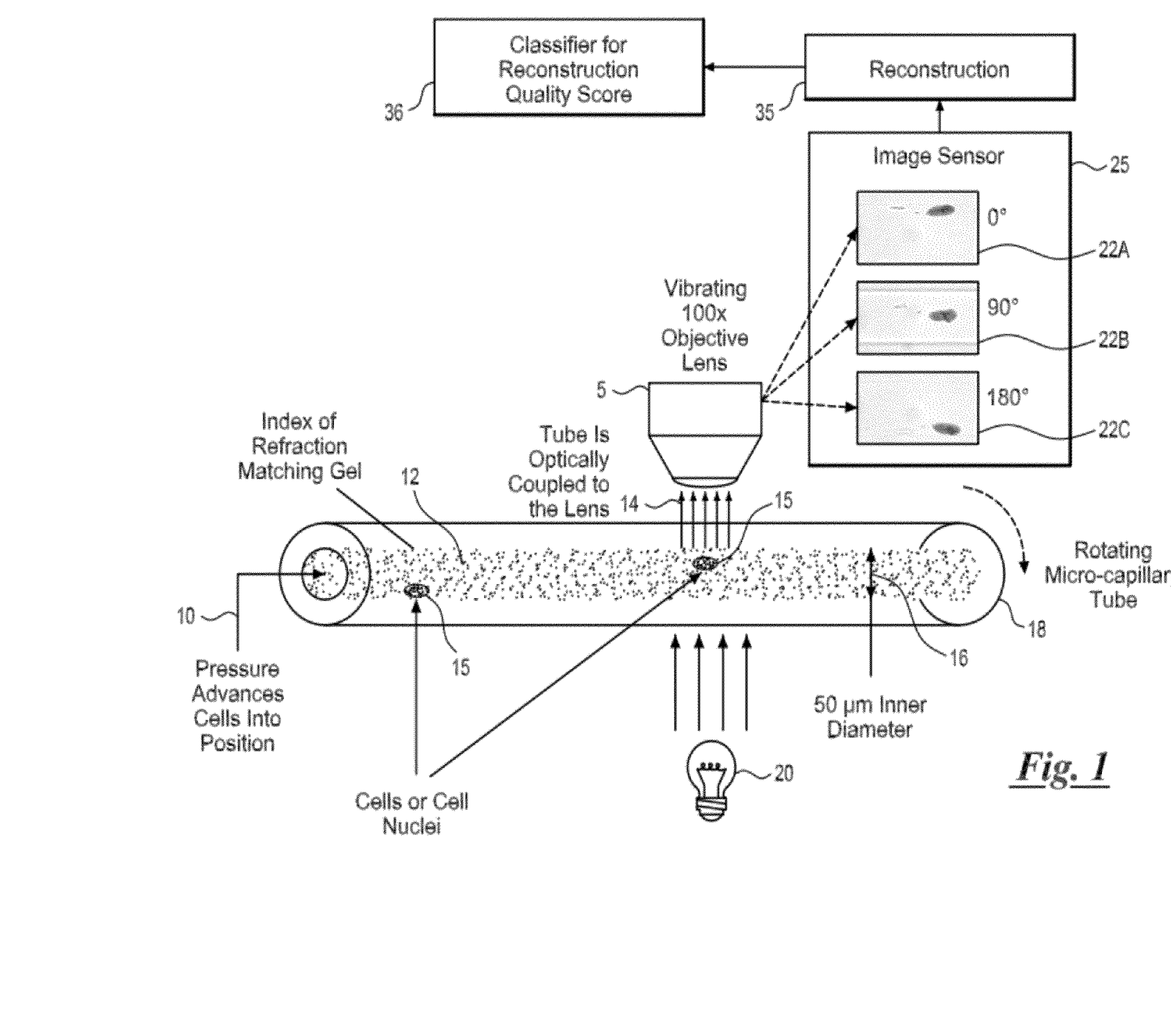
FIG. 1 shows a highly schematic view of an optical projection tomography system including a quality score classifier.

Referring now to FIG. 1 a highly schematic view of an optical projection tomography system including a quality score classifier is shown. Cells 15 are suspended in an index of refraction matching gel 12 contained in a capillary tube 18. Pressure 10 is applied to the gel 12 to move the cells into the optical path of a high-magnification microscope including an objective lens 5. The objective lens 5 is scanned or vibrated by, for example, a (not shown) piezo-electric element. The capillary tube 18 is positioned to be scanned by the vibrating objective lens 5. An illumination source 20 operates to illuminate objects, such as biological cells passing through the field of view of the objective lens 5. An image sensor 25 is located to acquire images transmitted from the objective lens 5. A plurality of pseudo-projection images, here exemplified by pseudo-projection images 22A, 22B and 22C are acquired by the image sensor 25 at varying angles of view as presented by the rotating capillary tube 18. The plurality of pseudo-projection images are then passed to a reconstruction processor 35 for producing 3D images. A quality score classifier 36 is coupled to the reconstruction processor 35 to receive the reconstructed 3D images. The quality score classifier, in one embodiment, then classifies the received images as acceptable or of poor quality and not acceptable for further analysis.

In the example, the plurality of pseudo-projection images, here exemplified by pseudo-projection images 22A, 22B and 22C are shown acquired at angles of 0°, 90° and 180° respectively. It will be understood that these are merely examples and that the number of pseudo-projection images actually acquired will typically be several hundred images. The reconstruction processor 35 may be of the type as described in Fauver et al. referenced hereinabove. The quality score classifier may, for example, advantageously assign numerical scores to the reconstructed 3D images where the numerical scores have values scaled to represent degrees of quality of the images. In other embodiments the quality score classifier may simply sort poor quality images from other images.

Having described the major components of an optical tomography system including a quality score classifier, it is now considered useful to an understanding of the invention to describe an example embodiment of operation of such a system. Taken in a substantially chronological order, an example of operation may include the following functions.

1. A specimen for examination is processed to remove non-diagnostic elements and is fixed and stained.
2. The specimen is then suspended in a gel medium. The cells in gel mixture are then inserted into a glass microcapillary tube 18 of approximately 50µ inner diameter 16.
3. Pressure is applied to the gel to move the cells into the optical path 14 of a high-magnification microscope.
4. Once the cells are in place the tube is rotated to permit capture of 500 high resolution images of the desired object taken over 360 degrees of tube rotation. These images are simulations of projection images created by integrating the light from the objective lens as the objective scans the nucleus. The simulated projection or pseudo-projection images thus represent the entire nuclear content in a single image, taken from a single perspective.
5. Pseudo-projection images are processed to correct for residual noise and motion artifacts.
6. The corrected pseudo projections are processed using filtered back projection to yield a 3D tomographic representation of the cell.
7. Based on the tomographic reconstruction, features are computed that are used, for example, to detect cells with characteristics of indicative of cancer and its precursors. These features may be used in a classifier whose output designates the likelihood that object under investigation belongs in a specified class, such as a cancer cell.

Among other things, good quality classification depends on good quality 3D reconstructions in step 6. Issues governing quality arise from detrimental effects that may be introduced by the operation of a given optical tomography system and characteristics relating to deficient correction of random cell motion occurring during image capture. If cells are not properly in focus in the set of pseudo-projections or if the cell moves off the camera frame during capture, the resulting reconstruction will not be ideal. In a likewise fashion, if proper corrections for the random motions arising during image capture are not made, then the various features of the cell will not reinforce each other in the reconstruction, thus compromising reconstruction quality.

Poor quality images may result in distorted reconstructions entering the classification stream, producing unpredictable results reflected in incorrect or distorted classification scoring. Therefore, poor quality reconstructions need to be detected to ensure the integrity of classification. A method for detecting poor quality reconstructions in cases where, for example, pseudo-projection images were not collected in an ideal way, when registration was not successful, or for other reasons affecting image quality, is described in detail herein sufficient for one skilled in the art to make and use the invention.

As described further herein, detection of poor quality reconstructions may be carried out by various methods including poor quality detection based on features describing streaking in reconstruction, poor quality detection based on a comparison between fixed focal plane and reconstructed slice, poor quality detection using parameters of cosine fitting to center of mass trends and the like. It has been observed that streaking may have various causes. Image quality issues due to poor focus and random motions affecting cell alignment have similar streaking effects on reconstructions.

Figure 2A:
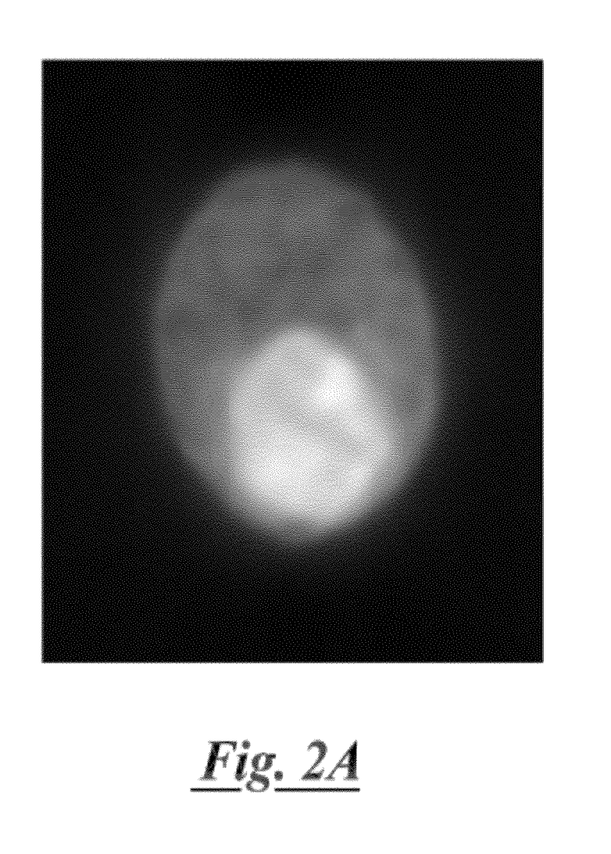
FIG. 2A and FIG. 2B show slices from reconstructions where pseudo-projections are in good focus and poor focus respectively.
Figure 2B:
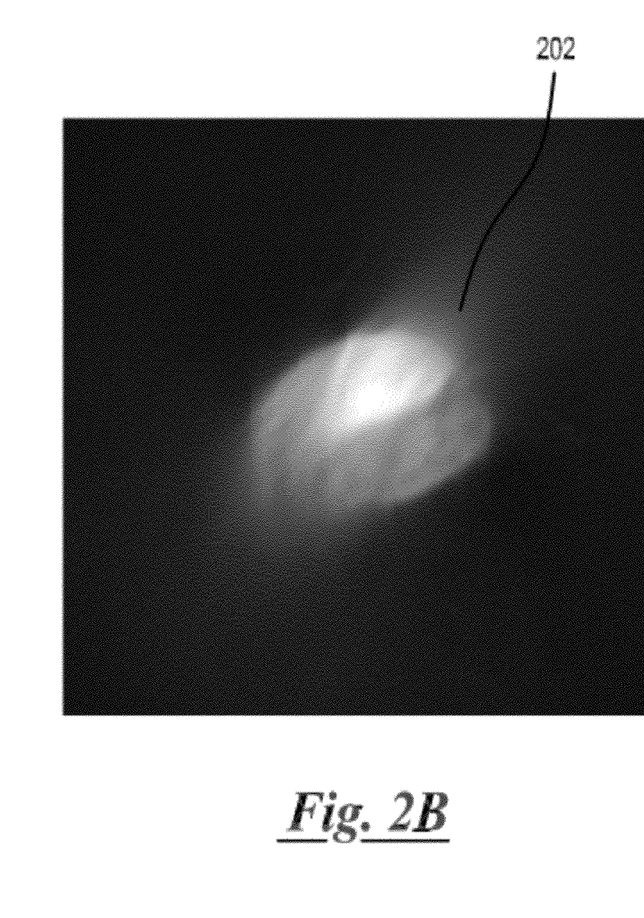

Referring now to FIG. 2A and FIG. 2B, slices from reconstructions where pseudo-projections are in good focus and poor focus respectively are shown. Now addressing effects of poor focus, it has been observed as shown in FIG. 2B, that occasionally, cells are not well focused across a sub-set of the pseudo-projections. In poorly focused pseudo-projections, morphology is usually blurred, producing blurred image features such as lobe 202. When back-projected, such blurred image features do not ideally align with the same features found in well-focused pseudo-projections from the same set. This lack of alignment creates a streaking effect in the reconstruction.

Figure 3A:
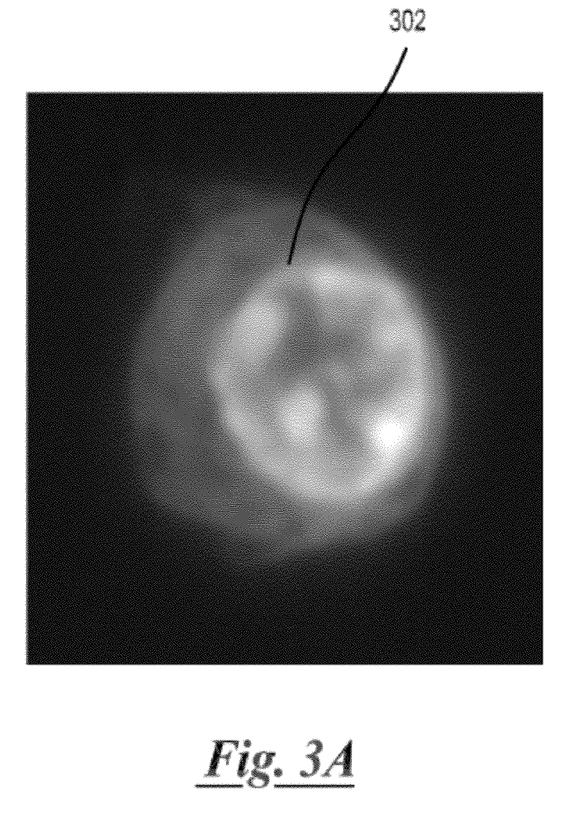
FIG. 3A and FIG. 3B show slices from reconstructions where pseudo-projections are in good alignment and poor alignment respectively.
Figure 3B:
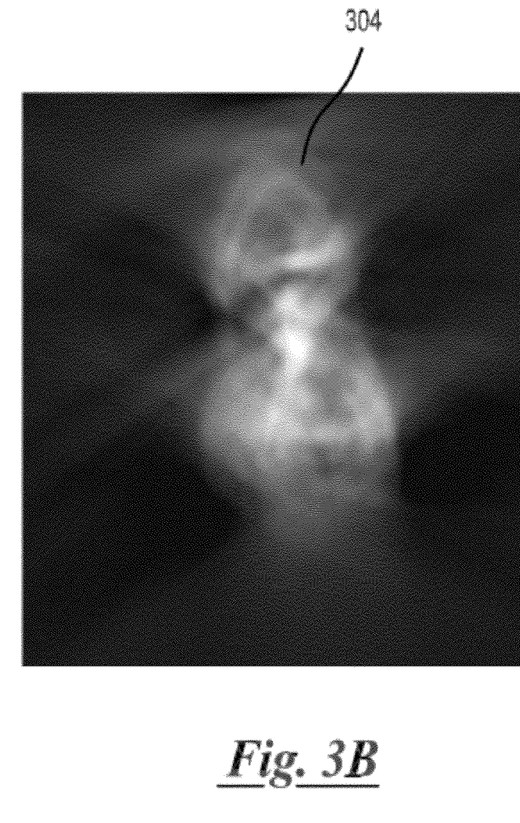

Referring now to FIG. 3A and FIG. 3B, slices from reconstructions where pseudo-projections are in good alignment and poor alignment respectively are shown. Poor alignment due to random motions of the cell occurring during image capture must be corrected for post-acquisition in software. One such system is described in US Patent Publication No. 20080285827, published Nov. 20, 2008, for U.S. Pat. No. 7,835,561 issued Nov. 16, 2010 to Meyer et al. entitled, "Method For Image Processing And Reconstruction Of Images For Optical Tomography," which is incorporated herein by reference.

In some circumstances, the correction algorithm does not converge to an appropriate solution and poor alignment is observed in the acquired set of corrected pseudo-projections that are used as input to the filtered-backprojection algorithm. As a result, cell morphology does not reinforce in the back-projection. The effect of poor alignment is similar to that of poor focus. Lack of good quality alignment produces streaking in the reconstruction. FIG. 3A shows a slice from a reconstruction from a well focused and well aligned cell. Note the crisp boundary 302 describing the cell and nucleus. FIG. 3B shows a slice from a reconstruction created where a sub-set of the pseudo-projections were well focused but poorly aligned with the other pseudo-projections. Note that cell and nuclear boundaries are not crisp and that a streak artifact is observed in the background of the reconstruction.

Comparing FIG. 2B and FIG. 3B, it can be observed that poor focus and poor registration produce similar effects on the reconstruction. These effects may be recognized in order to detect a poor quality reconstruction by characterizing the voxels in the reconstruction that are not associated with the cell. Performing the recognition based on the background allows for an algorithm that is not as strongly influenced by the diverse biology that one observes from cell to cell. The process begins with a segmentation algorithm to separate the cell from the background.

For some applications, segmentation development may be initiated with annotations of reconstructions made by hand drawn cell boundaries. These boundaries serve as a reference to guide development. The resulting segmentation algorithm includes identification of a threshold, selected for the particular cell under examination. In one example, threshold selection follows a procedure wherein a cell segmentation program first selects fifteen slices near the center of the reconstruction. With each slice a range of thresholds is applied and an area derivative and a second derivative is computed for each. To select a threshold for each slice, a negative second derivative is located at a threshold higher than the maximum area derivative. A global threshold is chosen using a percentile of the selected slice thresholds. Finally, the largest object is kept, and any holes in it are filled using digital techniques.

Figure 4:
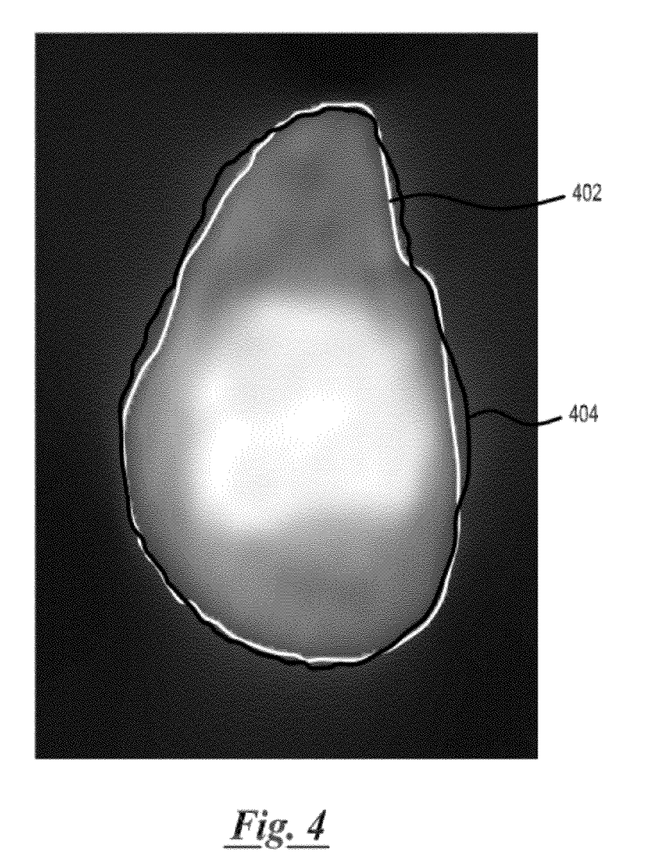
FIG. 4 shows a slice from a reconstructed cell where the cell boundary and corresponding segmentation boundary are shown.

Referring now to FIG. 4, a slice from a reconstructed cell where the cell boundary and corresponding segmentation boundary are shown. Using the segmentation techniques described herein a computed segmentation mask was developed to correspond to this boundary. The resulting segmentation algorithm produced the boundary 402. The segmentation mask was applied to the reconstruction by setting all voxel values in the reconstruction that are also within the segmentation mask to a value of 255. Those skilled in the art will recognize that voxel and pixel light intensity values for reconstructions and image slices typically vary in brightness on a scale from 0 to 255, but that other scales may also be employed without departing from the scope and spirit of the invention.

Figure 5A:
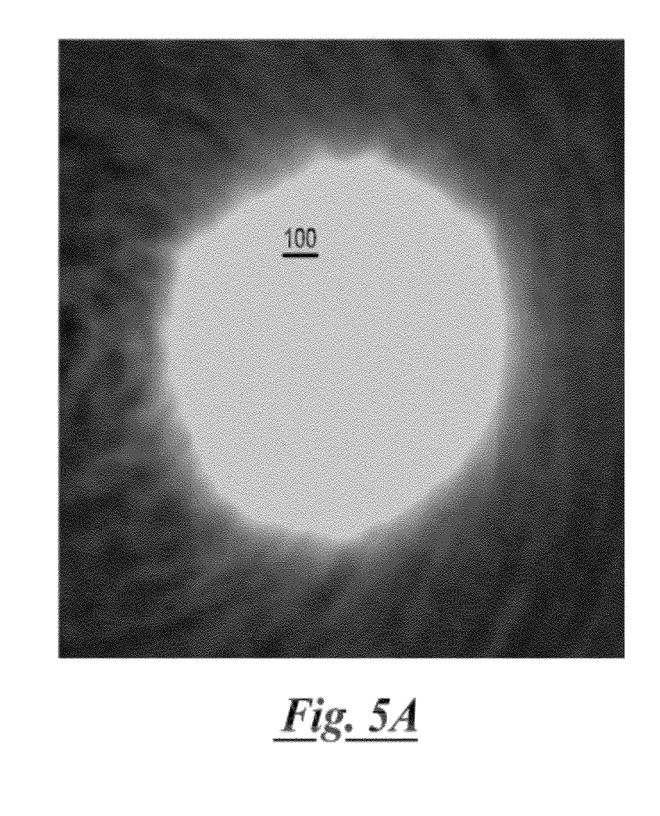
FIG. 5A and FIG. 5B show slices from reconstructions where pseudo-projections are in good alignment and poor alignment respectively.
Figure 5B:
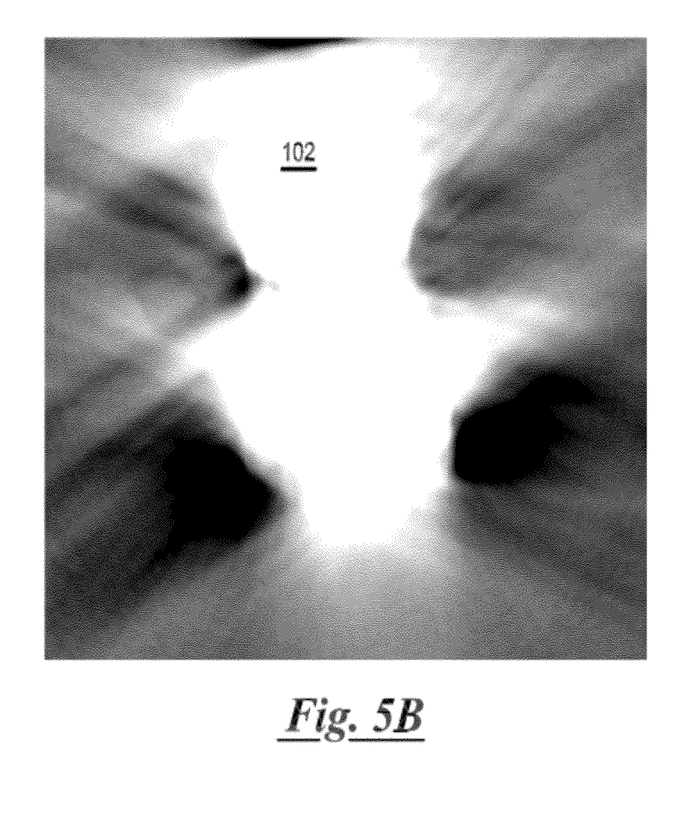

Referring now to FIG. 5A and FIG. 5B, slices from reconstructions where pseudo-projections are in good alignment and poor alignment respectively are shown. The pseudo projections include a cell 100, where the cell has been segmented and the background voxels have been amplified to fill the grey scale range. FIG. 5A and FIG. 5B respectively show the result of further processing of the images of FIG. 3A and FIG. 3B after a mask has been applied and the background has been equalized so that the histogram for the background extends across the available grey scale range. Note the prominent streak artifact 102 for the image associated with poor registration. The streak artifact 102 may be characterized by computing a set of features on those voxels in the reconstruction that are associated with the background of the reconstruction. Table 1 provides a list of features that may advantageously be employed for characterizing the streak effect.

TABLE I

| Feature Type | Description |
| --- | --- |
| Histogram | As seen in FIG. 5A and FIG. 5B, there is a greater variance in background voxels for the poorly aligned cell 102 versus the well aligned cell 100. Therefore, features that characterize various statistics on background voxels may be employed for detection of poor quality of reconstructions. Such statistics may advantageously include: mode, mean, median, variance, coefficient of variance, skewness, kurtosis, various percentiles of the histogram - 10th, 40th percentile, etc. |
| Spatial Frequency | As seen by comparing FIG. 5A and FIG. 5B, the images exhibit a different pattern in the spatial frequencies of the two different reconstructed slices. Therefore, procedures whose values characterize the spatial frequencies of the reconstructed slices |

TABLE I-continued

| Feature Type | Description |
|---|---|
| | may be employed for detection of poor quality of reconstructions. Useful procedures may advantageously include Fourier transforms, FFT, wavelet transform, etc. |
| Texture | Texture Features characterize the distribution of grey scale values in the background. Texture methods are based on mathematical morphology. Two methods may be especially important for quality detection. First, run length features characterize the length of a gray scale run. These are typically represented in a histogram. Run-length features are statistical moments computed on the run-length histogram, such as mean, variance, mode, etc., Second, blur residue features characterize texture by computing a difference image using morphological opening or closing on the background and subtracting it from the original, masked image. Statistically-based features may be then computed on the background voxels in the difference image for different choices of structure element used for opening and/or closing. |

Figure 6A:
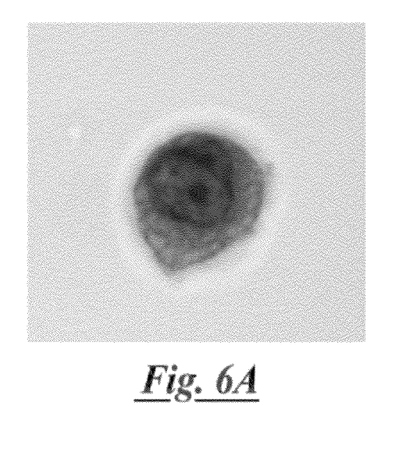
FIG. 6A and FIG. 6B show a fixed focal plane slice and a reconstruction slice for a good quality reconstruction.
Figure 6B:
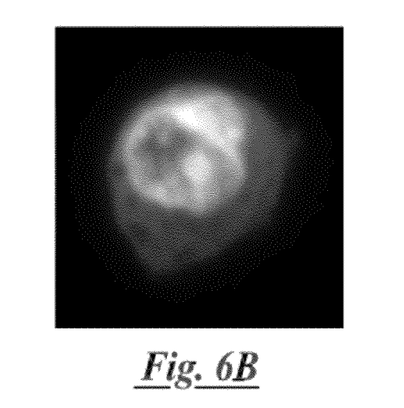
Figure 7A:
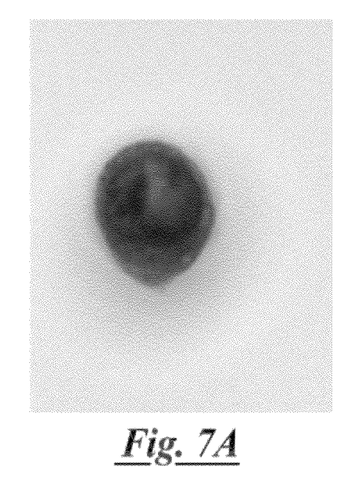
FIG. 7A and FIG. 7B show a fixed focal plane slice and a reconstruction slice for a poor quality reconstruction.
Figure 7B:
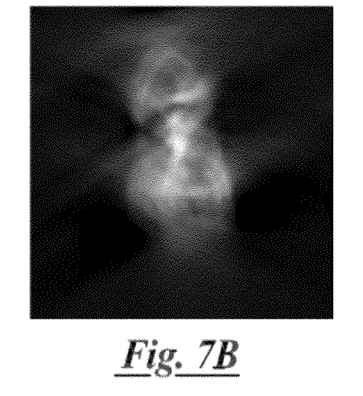

Another technique for assessing reconstruction quality is to compare reconstruction slices with their corresponding fixed focal plane slices. So long as they are well focused, fixed focal plane slices should be free of whatever distortions were introduced into the reconstruction during image capture or processing. Therefore, these images form an excellent reference to judge reconstruction quality. Referring now to FIG. 6A and FIG. 6B, fixed focal plane and reconstruction slices for a good quality reconstruction are shown respectively. FIG. 6A shows a fixed focal plane image and FIG. 6B shows a slice from the reconstruction that best matches it from a good quality reconstruction. Similarly, FIG. 7A shows a fixed focal plane image and FIG. 7B shows a slice from the reconstruction that best matches it from a poor quality reconstruction.

Features derived to judge good quality of reconstruction are formed by creating a difference image between the fixed focus and reconstruction slice images. In contrast with the above features of Table 1, difference image features are computed for those voxels that are associated with the cell. Low average difference for the portion of the images containing the cell reflects good quality of reconstruction.

Another useful method for detection of poor quality images employs parameters of cosine fitting to center of mass trends. As indicated by FIG. 1, data collection on an optical tomography system proceeds by moving objects, for example, cells, into position under the objective lens and spinning the capillary tube to collect the set of pseudo-projections. When viewed from a specific perspective the center of mass of the cell moves up and down in a cosine pattern when plotted against capillary angle of rotation. Poor registration occurs when the grey-scale mass is not conserved across all pseudo-projections. When this occurs, the trend in the center of mass often deviates from a cosine. Detection of poor quality reconstruction may therefore be potentially accomplished by fitting the trend in center of mass with a cosine function and characterizing the error of the fit. Specific features used for detection include the absolute and radius normalized maximum deviation, and root mean square error (RMSE) between center of mass cosine fit and trend.

Figure 8A:
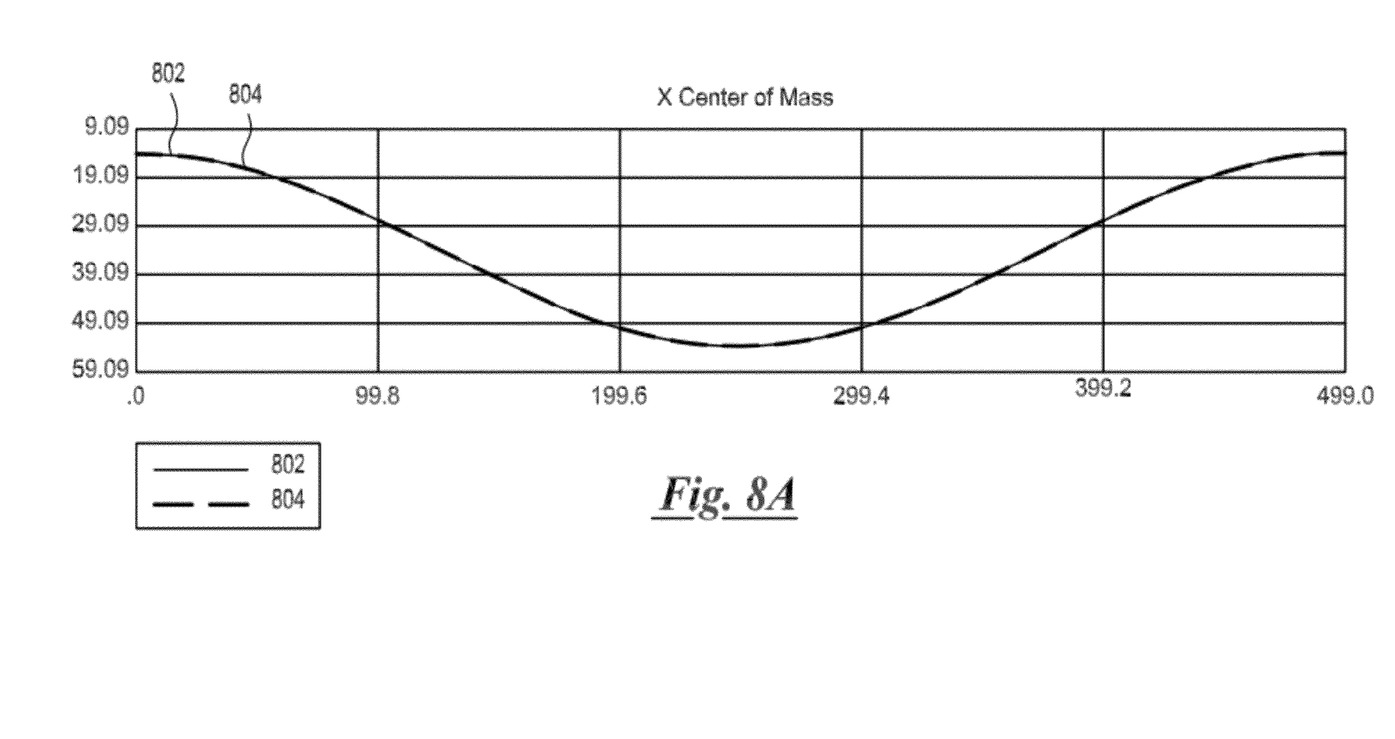
FIG. 8A shows a comparison of center of mass trend with a curve fit using a cosine function for a good quality reconstruction.
Figure 8B:
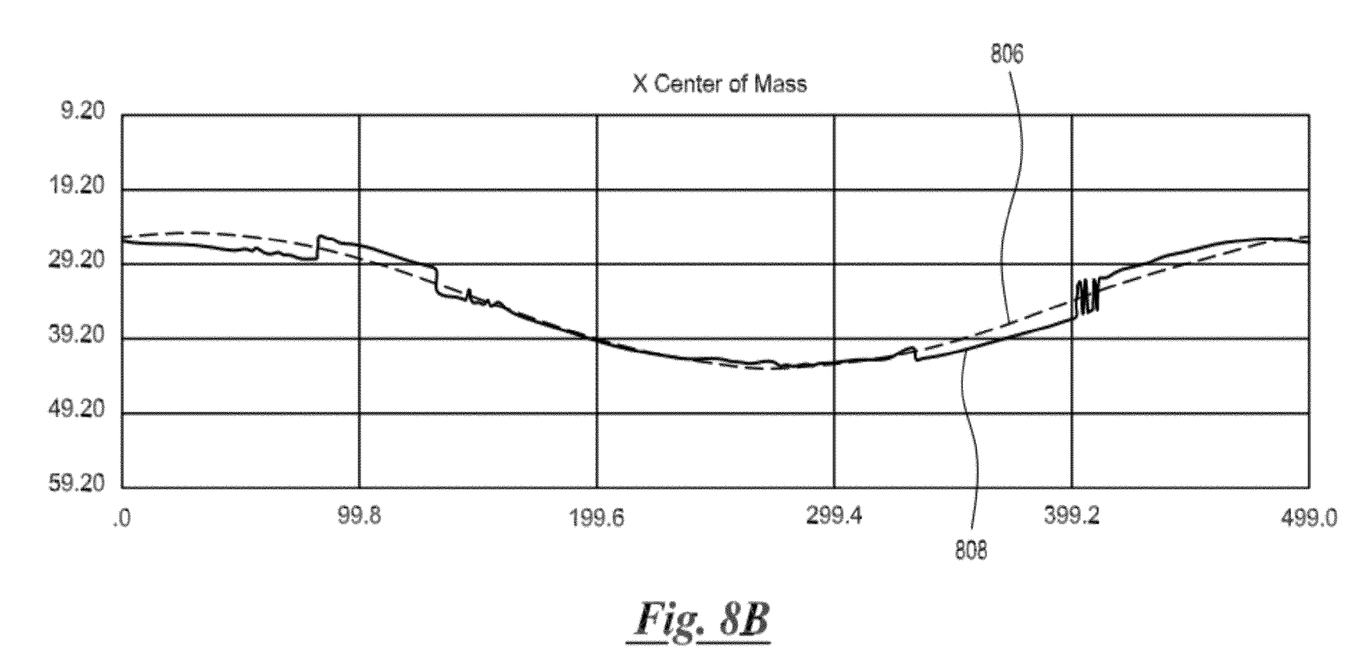
FIG. 8B shows a comparison of center of mass trend with a curve fit using a cosine function for a poor quality reconstruction.

Referring now to FIG. 8A, an example of a comparison of center of mass trend 802 with fit using a cosine 804 for a good quality reconstruction is shown. FIG. 8B shows an example of a comparison of center of mass trend 806 with fit using a cosine 808 for a poor quality reconstruction. In both graphs the horizontal axes represent the pseudo-projection number. The vertical axes represent the center of mass position in microns. Note the negligible deviation between fit 802 with trend 804 for the good reconstruction to the point that the curves essentially coincide, and the more substantial fit-trend deviation between lines 806 and 808 for the poor reconstruction.

With respect to the example of FIG. 8A the following curve fit statistics apply:
Fit error mean=0.102 µm,
Fit error standard deviation=0.071 µm,
Fit error maximum (absolute)=0.28 µm,
Fit error maximum delta=0.08 µm,
Radius to object center=19.797 µm,
X offset=−0.222 µm,
Phase=0.114 degrees,
Relative Deviation in frequency=0.147%, and
Linear drift in X=0 µm.

With respect to the example of FIG. 8B the following curve fit statistics apply:
Fit error mean=1.051 µm,
Fit error standard deviation=0.756 µm,
Fit error maximum (absolute)=2.35 µm,
Fit error maximum delta=4.541 µm,
Radius to object center=8.993 µm,
X offset=−0.14 µm,
Phase=−19.033 degrees,
Relative deviation in frequency=0.356%, and
Linear drift in X=0.005 µm.

Note that the error statistics, such as the fit error mean, for the poor quality reconstruction are an order of magnitude larger than the error statistics for a good quality reconstruction.

Figure 9:
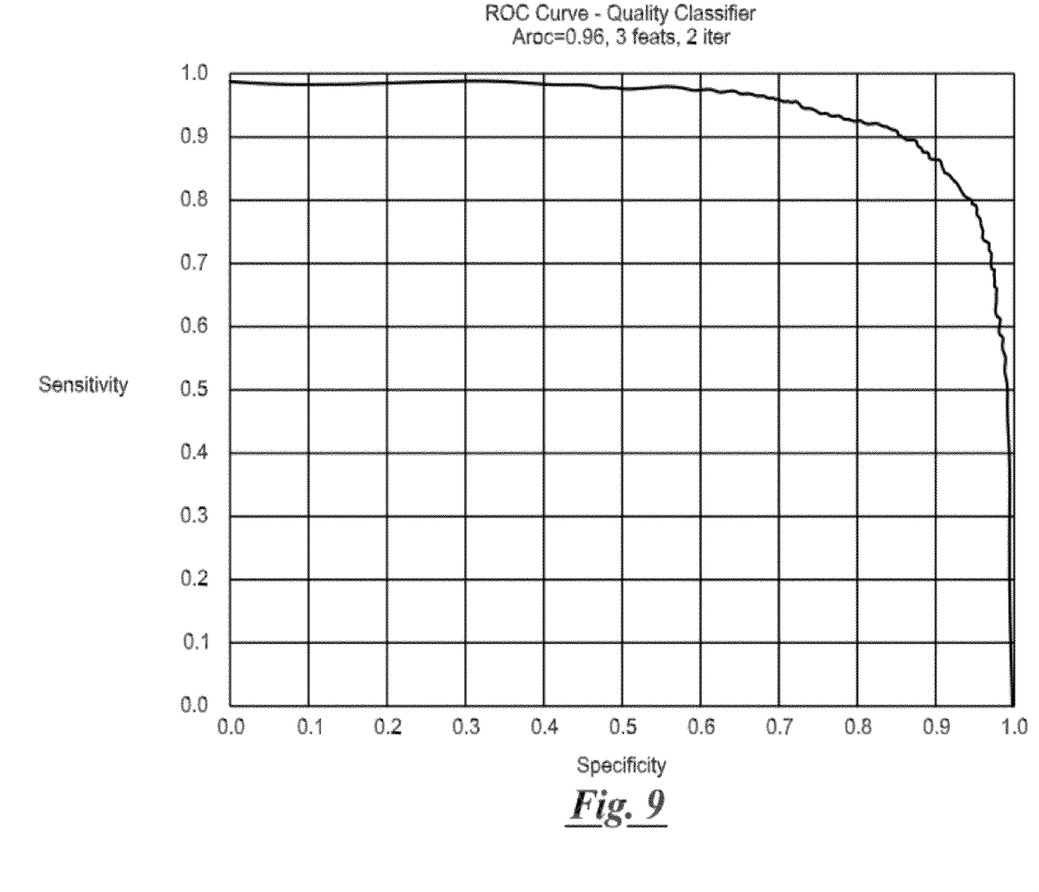
FIG. 9 shows quality classifier ROC curve where sensitivity measures the detection accuracy for poor reconstructions.

Referring now to FIG. 9, a quality classifier ROC curve is shown. Using the above described features and expert identification of poor reconstruction quality, a classifier was created whose output optimally corresponds to the expert identification. This correspondence may be summarized using a receiver operator characteristic (ROC) curve. Sensitivity is represented on the vertical axis ranging from 0.0 to 1.0. Here sensitivity measures the detection accuracy for poor reconstructions. Specificity is represented on the horizontal axis also ranging from 0.0 to 1.0. Those skilled in the art having the full benefit of this disclosure will understand how to build a quality scoring classifier using the selected features identified hereinabove.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A system for detecting poor quality images in an optical tomography system comprising:
   acquisition means for acquiring a set of pseudo-projection images of an object having a center of mass, where each of the set of pseudo-projection images is acquired at a different angle of view;
   reconstruction means, coupled to receive the pseudo-projection images, for reconstruction of the pseudo-projection images into 3D reconstruction images; and
   quality means for classification of the 3D reconstruction images using selected features that characterize poor quality reconstructions wherein the set of pseudo-projection images present a center of mass trend for the object and the selected features are calculated from a comparison of the center of mass trend with a cosine function fitting the trend in the center of mass.

2. The system of claim 1 wherein the selected features describe streaking in the 3D reconstruction images.

3. The system of claim 1 wherein the selected features include difference image features that are formed by creating a difference image between a fixed focus image and a reconstruction slice image.

4. The system of claim 3 wherein the difference image features are computed for those voxels that are associated with the cell including an average difference for the portion of the images containing the cell.

5. The system of claim 1 wherein the calculation of the selected features includes measuring an error between the cosine function and the center of mass trend.

6. The system of claim 5 wherein the selected features include the absolute and radius normalized maximum deviation, and root mean square error (RMSE) between the cosine function and the center of mass trend.

7. The system of claim 1 wherein the selected features are selected from the group consisting of histogram statistics, texture features and spatial frequency features.

8. The system of claim 1 wherein the object comprises a biological cell.

9. A method for detecting poor quality images in an optical tomography system comprising:
    operating the optical tomography system to acquire a set of pseudo-projection images of an object having a center of mass, where each of the set of pseudo-projection images is acquired at a different angle of view;
    transmitting the set of pseudo-projection images to a processor for reconstructing the pseudo-projection images into 3D reconstruction images; and
    operating the processor to classify the 3D reconstruction images using selected features that characterize poor quality reconstructions wherein the selected features include difference image features that are formed by creating a difference image between a fixed focus image and a reconstruction slice image.

10. The method of claim 9 wherein the selected features describe streaking in the 3D reconstruction images.

11. The method of claim 9 wherein the difference image features are computed for those voxels that are associated with the cell including an average difference for the portion of the images containing the cell.

12. The method of claim 9 wherein the set of pseudo-projection images present a center of mass trend for the object and the selected features are calculated from a comparison of the center of mass trend with a cosine function fitting the trend in the center of mass.

13. The method of claim 12 wherein the calculation of the selected features includes measuring an error between the cosine function and the center of mass trend.

14. The method of claim 13 wherein the selected features include the absolute and radius normalized maximum deviation, and root mean square error (RMSE) between the cosine function and the center of mass trend.

15. The method of claim 9 wherein the selected features are selected from the group consisting of histogram statistics, texture features and spatial frequency features.

16. The method of claim 9 wherein the object comprises a biological cell.

17. A system for detecting poor quality images in an optical tomography system where a set of cells are suspended in an index of refraction matching gel contained in a rotating capillary tube, where pressure is applied to the gel to move the cells into the optical path of a microscope including an objective lens that is scanned through the capillary tube while an illumination source operates to illuminate cells passing through the field of view of the objective lens and where the optical tomography system includes an image sensor located to acquire pseudo-projection images transmitted from the objective lens, where each of the set of pseudo-projection images is acquired at a different angle of view, the system comprising:
    a reconstruction processor, coupled to receive a set of pseudo-projection images of each of the set of cells, each cell having a center of mass, where the reconstruction processor creates at least one 3D reconstruction image;
    a quality score classifier coupled to receive the at least one 3D reconstruction image, where the quality score classifier scores selected features in the at least one 3D reconstruction image;
    wherein the selected features describe streaking in reconstruction;
    wherein the set of pseudo-projection images present a center of mass trend for the cell and the selected features further include comparison features calculated from a comparison of the center of mass trend with a cosine fit curve;
    wherein the selected features include difference image features that are formed by creating a difference image between a fixed focus image and a reconstruction slice images; and
    wherein the difference image features are computed for voxels that are associated with the cell including an average difference for the portion of the images containing the cell.

18. The system of claim 17 wherein the calculation of the selected features includes selected features includes measuring an error between the cosine function and the center of mass trend.

19. The system of claim 18 wherein the selected features include the absolute and radius normalized maximum deviation, and root mean square error (RMSE) between the cosine function and the center of mass trend.

20. The system of claim 17 wherein the selected features are selected from the group consisting of histogram statistics, texture features and spatial frequency features.

* * * * *